United States Patent [19]
Ozaki et al.

[11] Patent Number: 4,695,696
[45] Date of Patent: Sep. 22, 1987

[54] ELECTRIC DISCHARGE MACHINE WITH CONTROL OF THE MACHINING PULSE'S CURRENT VALUE IN ACCORDANCE WITH THE DELAY TIME

[75] Inventors: Yoshio Ozaki; Kazuo Tsurumoto; Takeshi Yatomi; Masahiro Yamamoto, all of Aichi, Japan

[73] Assignee: Mitsubishi Denki Kabushiki Kaisha, Tokyo, Japan

[21] Appl. No.: 584,440

[22] PCT Filed: May 27, 1983

[86] PCT No.: PCT/JP83/00167
§ 371 Date: Jan. 30, 1984
§ 102(e) Date: Jan. 30, 1984

[87] PCT Pub. No.: WO83/04204
PCT Pub. Date: Dec. 8, 1983

[30] Foreign Application Priority Data
May 28, 1982 [JP] Japan .................................. 57-90799

[51] Int. Cl.4 ........................... B23H 1/02; B23H 7/04
[52] U.S. Cl. ............................... 219/69 P; 219/69 C; 219/69 W
[58] Field of Search ................ 219/69 W, 69 P, 69 M, 219/69 C, 69 S

[56] References Cited

U.S. PATENT DOCUMENTS

| | | | |
|---|---|---|---|
| 2,979,639 | 4/1961 | Williams et al. | 219/69 P |
| 3,578,937 | 5/1971 | Sennowitz | 219/69 P |
| 3,604,885 | 9/1971 | Inoue | 219/69 P |
| 3,655,936 | 4/1972 | Saito et al. | 219/69 C |
| 3,668,361 | 6/1972 | O'Connor | 219/69 C |
| 3,671,705 | 6/1972 | Raznitsyn | 219/69 C |
| 3,705,286 | 12/1972 | Kondo et al. | 219/69 S |
| 3,705,287 | 12/1972 | Saito et al. | 219/69 C |
| 3,812,317 | 5/1974 | De Bont et al. | 219/69 P |
| 3,816,692 | 6/1974 | Ratmansky | 219/69 C |
| 3,825,715 | 7/1974 | Saito et al. | 219/69 M |
| 3,857,011 | 12/1974 | Saito et al. | 219/69 P |
| 3,977,753 | 12/1976 | Inoue | 219/69 M |
| 3,999,028 | 12/1976 | Saito et al. | 219/69 P |
| 4,504,722 | 3/1985 | Kishi et al. | 219/69 C |

FOREIGN PATENT DOCUMENTS

| | | | |
|---|---|---|---|
| 50-8179 | 1/1975 | Japan . | |
| 55-48531 | 4/1980 | Japan | 219/69 C |
| 55-48533 | 4/1980 | Japan | 219/69 C |
| 55-54140 | 4/1980 | Japan | 219/69 C |
| 163836 | 12/1981 | Japan | 219/69 P |

Primary Examiner—A. D. Pellinen
Assistant Examiner—Geoffrey S. Evans
Attorney, Agent, or Firm—Sughrue, Mion, Zinn, Macpeak, and Seas

[57] ABSTRACT

In an electric discharge machine having a main switching circuit 24 for supplying a current high in current peak value between which are an electrode 10 and a workpiece 12, and an auxiliary switching circuit 26 for supplying a current low in current peak value between the electrodes, to intermittently cause electric discharge between the electrodes which are the electrode 10 and the workpiece; a voltage is applied across the electrodes by the auxiliary switching circuit 26, and when no electric discharge occurs between the electrodes before a decision set time of 1 to 4 μsec, the application of the voltage across the electrodes by the auxiliary switching circuit 26 is continued until discharge occurs therebetween and when the discharge occurs the main switching circuit 24 is caused to supply a normal current between the electrodes according to a given surface roughness, and when discharge or short-circuiting occurs between the electrodes before the decision set time the main switching circuit 24 or the auxiliary switching circuit 26 is caused to supply a current smaller than the normal current between the electrode. As a result the machining speed for the surface roughness of the workpiece is increased, and the machining stability is improved.

8 Claims, 7 Drawing Figures

ELECTRIC DISCHARGE MACHINE WITH CONTROL OF THE MACHINING PULSE'S CURRENT VALUE IN ACCORDANCE WITH THE DELAY TIME

TECHNICAL FIELD

This invention relates to electric discharge machines, and more particularly to an electric discharge machine which comprises a main switching circuit for supplying a current high in peak value between an electrode and a workpiece, and an auxiliary switching circuit for supplying a current low in peak value between the electrodes, to intermittently cause electric discharge between the electrodes.

BACKGROUND ART

Systems for supplying machining energy from a machining electric source to the electrodes of a wire cutting electric discharge machine can be roughly classified into a first group of systems in which a capacitor is connected between an electrode and a workpiece and the capacitor thus connected is charged through a switching transistor which is turned on and off, so that electric discharge machining is carried out by utilizing the voltage of the capacitor thus charged, and a second group of systems in which the current between the electrodes is directly controlled on and off by a switching circuit connected between the power source and the electrodes.

Figure 1:
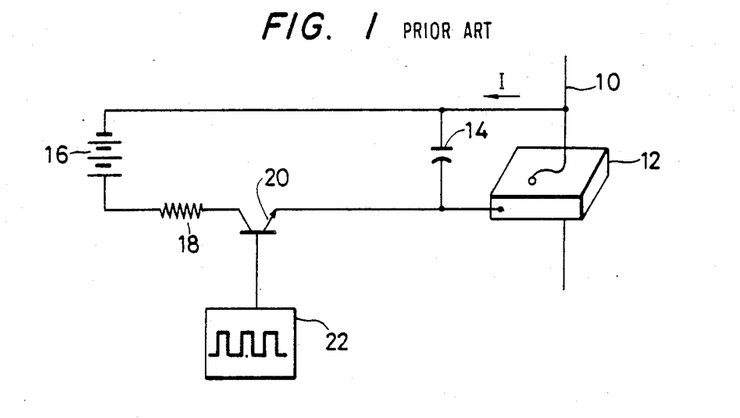
FIG. 1 is a circuit diagram showing a conventional wire cutting electric discharge machine.

In the first group of systems, as shown in FIG. 1, a capacitor 14 is connected between a wire electrode 10 and a workpiece 12, and machining energy from a power source 16 is supplied through a current limiting resistor 18 and a switching transistor 20 to the capacitor 14 thus connected. The capacitor 14 is charged through the switching transistor 20 which is turned on and off by an on-off pulse signal outputted by an oscillator 22. Thus, pulse voltage and current are applied between the wire electrode 10 and the workpiece 12 by the capacitor 14 thus charged.

Figure 2:
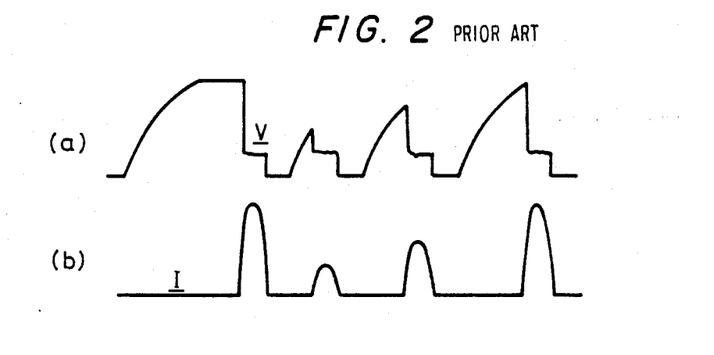
FIG. 2 is a waveform diagram showing the waveforms of the interelectrode voltage and current of the conventional machine in FIG. 1.

The parts (a) and (b) of FIG. 2 are waveform diagrams respectively showing an interelectrode voltage V and a machining current I in the electric discharge machine in FIG. 1. The waveform of the interelectrode voltage V is defined by the time constant CR which is determined from the capacitance C of the capacitor 14 and the resistance R of the resistor 18. In the machine shown in FIG. 1, the timing of occurrence of electric discharge between the electrodes depends on the gap between the electrodes, the specific resistance of the machining solution between the electrodes and the presence of powder which is created during electric discharge machining. Therefore, for instance, electric discharge starts before the charge voltage of the capacitor 14 reaches the supply voltage Vcc, or with a delay time after it reaches the interelectrode voltage. In this case, the peak value Ip and the pulse width τp of the current between the electrodes are as follows:

$$Ip = E\sqrt{\frac{C}{L}} \quad \tau p = \pi\sqrt{LC}$$

In these equations, E is the discharge start voltage, and L is the inductance of the current path. Accordingly, in the machine in FIG. 1, the machining current is determined by the voltage E which is provided at the start of electric discharge. Therefore, the machining current value is not constant for every electric discharge. On the other hand, as the amount of a part of the workpiece, which is removed by one discharge machining operation depends on the value of current which is provided during electric discharge, the machined surface roughness is determined by the maximum value of current during electric discharge. In general, as a discharge current is increased, the discharge machining speed is increased. However, the wire cutting electric discharge machine in FIG. 1 suffers from a difficulty that, since the machining current is not constant for every electric discharge, the machining speed for a given surface roughness is decreased.

Figure 3:
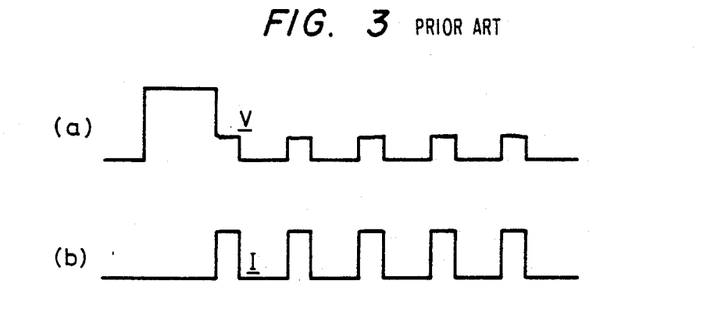
FIG. 3 is a waveform diagram showing the waveforms of the interelectrode voltage and current of another conventional wire cutting electric discharge machine.

One example of the second group of systems has been disclosed by Japanese Patent Application Publication No. 13195/1969. It will be briefly described. The system has a main switching circuit for supplying a current large in peak value between the electrodes, and an auxiliary switching circuit which is small in current peak value and is used only to supply a voltage across the electrodes. First the auxiliary switching circuit applies the voltage across the electrodes, and after the occurrence of electric discharge has been detected, the main switching circuit is closed for a predetermined period of time to apply current as desired. Accordingly, as shown in the parts (a) and (b) of FIG. 3, discharge current I uniform with respect to an interelectrode voltage V can be formed so as to be supplied between the electrodes. Therefore, the machining speed for a given surface roughness can be increased, so that the above-described difficulty accompanying the first group of systems using the capacitor is eliminated. However, the second group of systems still suffers from the following drawbacks:

The first drawback is that the desired machining current flows even during abnormal electric discharge (for instance when there is no no-load time in which electric discharge is not started even by application of voltage; i.e., the electric discharge is started upon application of the voltage). The second drawback resides in that, since the same current flows even when short-circuiting occurs between the wire electrode and the workpiece, the wire electrode, etc. may be broken by Joule heat. These will be described in more detail. The average current $\bar{I}$ during machining is as follows:

$$\bar{I} = Ip \times \frac{T_{ON}}{T_{OFF} + T_{OPEN} + T_{ON}}$$

where $T_{ON}$ is the period of time for which the main switching circuit is closed to supply the current, $T_{OFF}$ is the pause time for which application of the voltage is suspended, Ip is the peak current, and $T_{OPEN}$ is the average no-load time. On the other hand, the average current $\bar{I}'$ during abnormal electric discharge is:

$$\bar{I}' = Ip \times \frac{T_{ON}}{T_{OFF} + T_{ON}}.$$

Therefore, the current increase rate $\bar{I}/\bar{I}'$ during abnormal discharge is:

$$\frac{\bar{I}}{\bar{I}'} = \frac{T_{OFF} + T_{ON}}{T_{OFF} + T_{OPEN} + T_{PM}}$$

In general, in a wire cutting electric discharge machining operation, the difference between ($T_{OFF}+T_{ON}$) and ($T_{OPEN}$) being large, ($T_{OPEN}$) should be two to three times ($T_{OFF}+T_{ON}$) or more, and therefore the current $\bar{I}'$ during abnormal discharge is two to three times the current $\bar{I}$ or more. However, as the current which can flow in the wire electrode is limited, the wire electrode may be broken during abnormal discharge.

As is apparent from the above description, the second group of system can eliminate the drawback accompanying the first group of systems; however, it suffers from the drawback that the wire electrode is broken when abnormal conditions occur—for instance when, with a wire cutting electric discharge machine, a straight-line machining operation is switched over to a pattern machining operation (the wire being most frequently broken in this case), or when the operation of the interelectrode voltage servo mechanism is not suitable, or when the interelectrode servo does not operate quickly because of the large vibration of the wire electrode.

SUMMARY OF THE INVENTION

In view of the above-described drawbacks accompanying a conventional electric discharge machine, an object of this invention is to provide an electric discharge machine having an auxiliary switching circuit for supplying a current small in peak value between the electrodes. It is detected whether or not electric discharge occurs within a decision set time. When no electric discharge occurs within the set time the auxiliary switching circuit is caused to supply an initial voltage even after the set time. When the occurrence of discharge is thereafter detected a main switching circuit for supplying a current large in peak value is caused to supply a normal current suitable for a surface roughness required for the workpiece; and when electric discharge or short-circuiting occurs within the set time a current smaller than the normal current is immediately supplied by the main switching circuit or the auxiliary switching circuit, whereby the workpiece machining speed is increased, the machining speed for a given surface roughness is increased, and the machining operation is stable.

BEST MODE FOR CARRYING OUT THE INVENTION

One preferred embodiment of this invention will be described with reference to the accompanying drawings.

Figure 4:
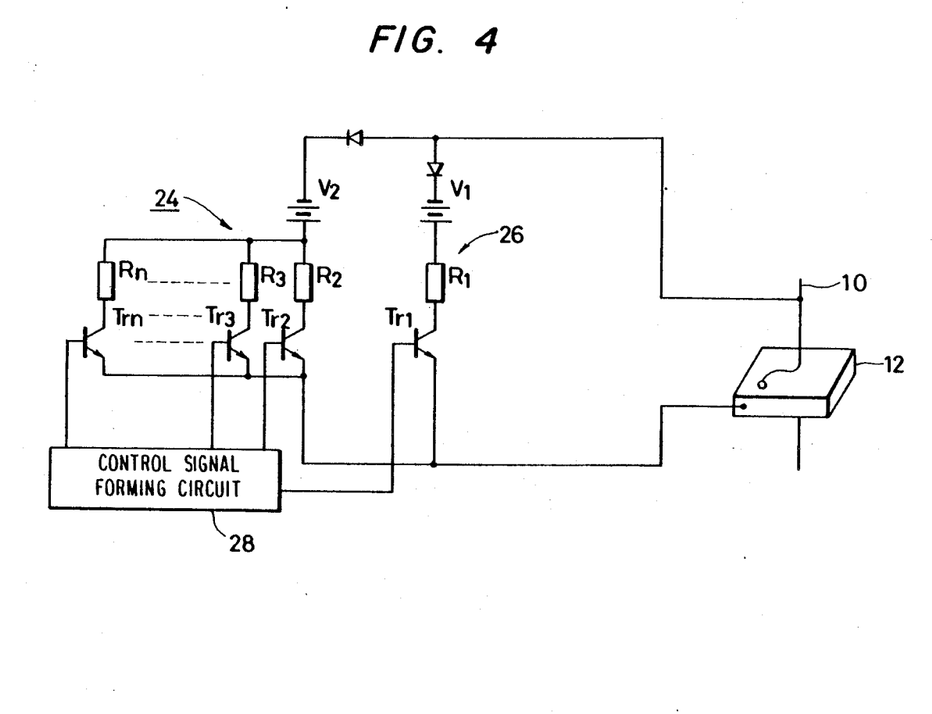
FIG. 4 is a circuit diagram outlining the arrangement of a wire cutting electric discharge machine according to this invention.

FIG. 4 is a circuit diagram outlining one example of an electric discharge machine according to the invention. A main switching circuit 24 and an auxiliary switching circuit 26 are connected in parallel between a wire electrode 10 and a workpiece electrode 12. The main switching circuit 24 is a series circuit of a DC source $V_2$ and a parallel circuit of a series circuit of a resistor $R_2$ and a switching element $Tr_2$ such as a transistor, a series circuit of a resistor $R_3$ and a switching element $Tr_3$ such as a transistor, . . . and a series circuit of a resistor $R_n$ and a switching element $Tr_n$ such as a transistor. The auxiliary switching circuit 26 is a series circuit of a DC source $V_1$, a resistor $R_1$ and a switching element $Tr_1$ such as a transistor. In the electric discharge machine, the value of the resistor $R_1$ is so selected that the auxiliary switching circuit 26 supplies such a current that the peak current value is around a discharge maintaining current value or higher. The switching elements $Tr_2$ through $Tr_n$ and $Tr_1$ in the main switching circuit 24 and the auxiliary switching circuit 26 are turned on and off by the output of a control signal forming circuit 28.

Figure 5:
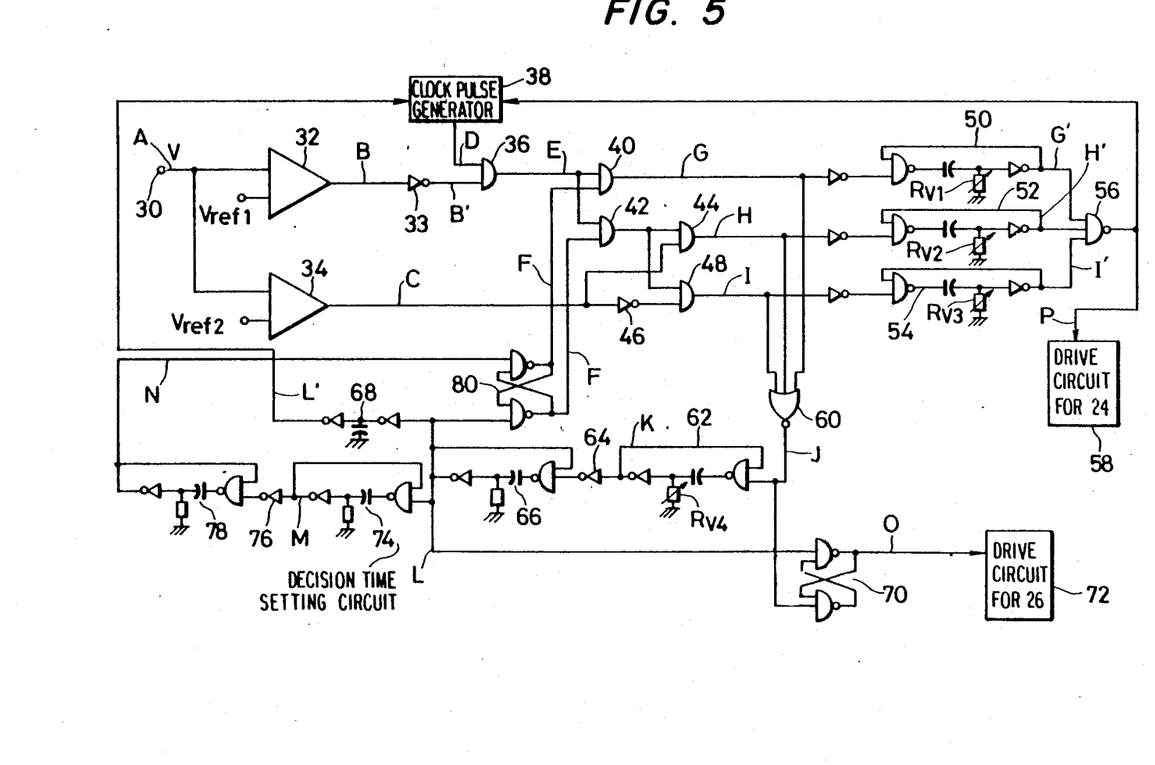
FIG. 5 is a circuit diagram showing a concrete example of a control signal forming circuit in the machine in FIG. 4.

One example of the control signal forming circuit 28 is as shown in FIG. 5. An interelectrode voltage V is supplied to an input terminal 30, and is further applied to comparison circuits 32 and 34 to which reference voltages $V_{ref1}$ and $V_{ref2}$, respectively, are applied. The reference voltage $V_{ref1}$ is set higher than the arc potential during discharge and lower than the supply voltage $V_1$, while the reference voltage $V_{ref2}$ is set lower than the arc potential during discharge and higher than the zero potential.

That is, the comparison circuit 32 is to detect discharge between the electrodes, while the comparison circuit 34 is to detect short-circuiting between the electrodes. Thus, the comparison circuits 32 and 34 form a detector circuit for detecting the occurrence of discharge or short-circuiting between the electrodes.

The comparison output B of the comparison circuit 32 is applied through an inverter circuit 33 to one input terminal of an AND circuit 36 to the other input terminal of which a clock pulse D of 1 to 5 MHz from a clock pulse generator circuit 38 is applied. The clock pulse generator circuit 38 starts oscillation to output the clock pulse D in response to a signal L' (described later) and stops the oscillation in response to a signal P.

The output signal E of the AND circuit 36 is applied to an AND circuit 40 to which an acknowledge output signal is applied (by what is referred to as "an FF circuit 80", when applicable) described later. The signal E is further applied to an AND circuit 42 to which a negative acknowledge output signal $\bar{F}$ is applied by the FF circuit 80.

The output signal of the AND circuit 42 is applied to one input terminal of an AND circuit 44 to the other input terminal of which the comparison output signal C of the above-described comparison circuit 34 is applied. The output signal of the AND circuit 42 is further applied to one input terminal of an AND circuit 48 to the other input terminal of which the comparison output signal C is applied through an inverter circuit 46.

The output signals G, H and I of the AND circuits 40, 44 and 48 are applied respectively through monostable circuits 50, 52 and 54 to a NAND circuit 56. The output signal P of the NAND circuit 56 is applied to a drive circuit 58 for the main switching circuit 24, and is further applied, as a stop signal, to the above-described clock pulse generator circuit 38. In the monostable circuits 50, 52 and 54, the pulse widths $T_1$, $T_2$ and $T_3$ are adjusted by variable resistors $R_{v1}$, $R_{v2}$ and $R_{v3}$, respectively, so that the width of a current flowing between the electrodes of the main switching circuit 24 is controlled by the output of the drive circuit 58 and the machining current flows according to interelectrode conditions.

That is, the AND circuits 40, 44 and 48, the monostable circuits 50, 52 and 54, the NAND circuit 56 and the drive circuit 58 form means for driving the main switching circuit 24 according to interelectrode conditions.

On the other hand, the output signals G, H and I of the AND circuits 40, 44 and 48 are applied to a NOR circuit 60, which provides an output signal J representing the timing of opening of the auxiliary switching circuit 26. The output signal J is applied to a monostable circuit 62 in which the pause period $T_{OFF}$ is set by a variable resistor $R_{v4}$. The output signal K of the monostable circuit 62 is applied through an inverter circuit 64 to a monostable circuit 66 which outputs a pause completion pulse L.

The output signal L of the monostable circuit 66 is applied to a delay circuit 68 having a delay time which is a very short time $\Delta T$. The delay output signal L' is applied as the start signal to the clock pulse generator circuit 38. The output signal L is applied to the set input terminal of a flip-flop circuit 70 (hereinafter referred to as "an FF circuit 70", when applicable) to which the output signal J of the monostable circuit 66 is supplied. The acknowledge output signal O of the FF circuit 70 is applied to a drive circuit 72 for the auxiliary switching circuit 72, to turn on and off the switching element $Tr_1$.

That is, the NOR circuit 60, the FF circuit 70 and the drive circuit 72 form initial voltage continuing means for continuously applying an initial voltage across the electrodes with the aid of the auxiliary switching circuit 26, and the NOR circuit 60, the FF circuit 70, the drive circuit 72 and the monostable circuits 62 and 66 form an initial voltage applying means.

The output signal L of the monostable circuit 66 is further applied to a monostable circuit 74, which provides an output signal M representing a discharge monitoring set time $T_S$. The output signal M is applied through an inverter circuit 76 and a monostable circuit 78 to the set input terminal of the FF circuit 80, to the reset input terminal of which the output signal L of the monostable circuit 66 is supplied.

Thus, the monostable circuit 74 forms a decision time setting circuit for setting a time which is suitable for deciding whether or not discharge between the electrodes is normal.

The acknowledge output signal F and the negative acknowledge output signal $\overline{F}$ of the FF circuit 80 are supplied to the AND circuits 40 and 42, respectively.

One example of the control signal forming circuit 28 is designed as described above. The operation of the circuit 28 will be described with reference to a waveform diagram in FIG. 6.

Figure 6:
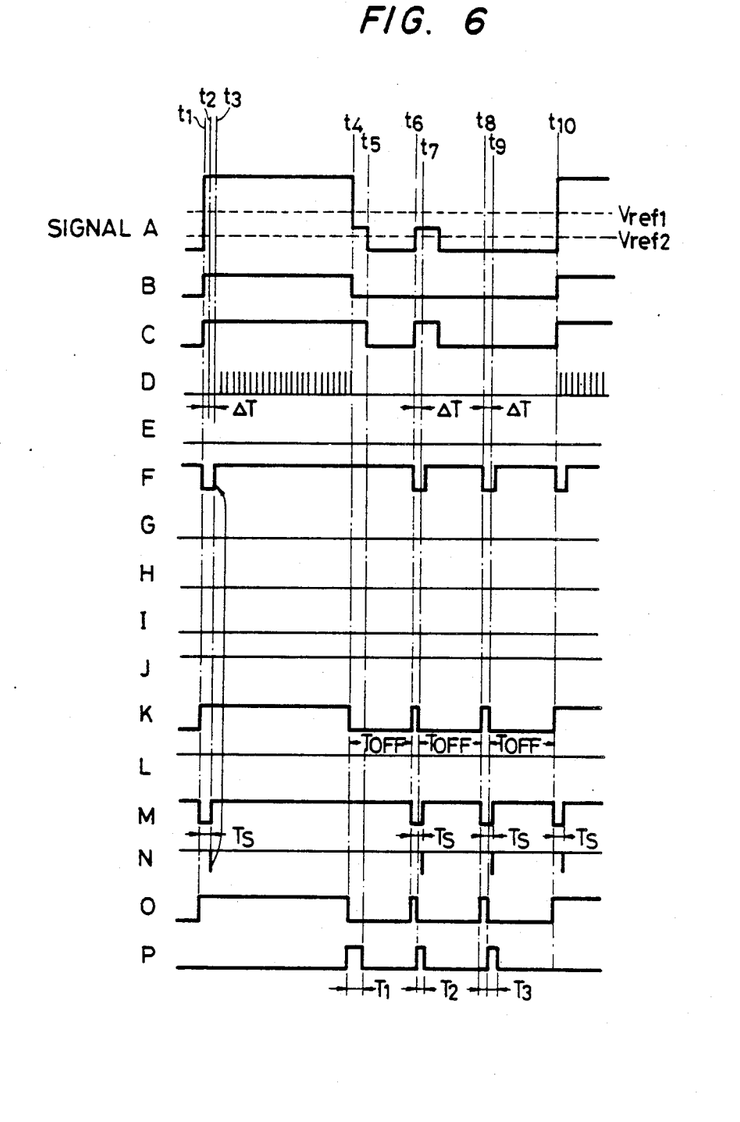
FIG. 6 is a waveform diagram showing the waveforms of signals at various circuit points in the circuit of FIG. 5.

It is assumed that at the time instant $t_1$ the pause period $T_{OFF}$ of interelectrode discharge voltage application is ended, the output signal k of the monostable circuit 62 is raised to the high level and the output signal L of the monostable circuit 66 are set to the low level for a moment, whereby the FF circuit 70 is set while the FF circuit 80 is reset, the switching element $T_{r1}$ of the auxiliary switching circuit 26 is turned on by the drive circuit 72, and the voltage V high enough to start discharge between the wire electrode 10 and the workpiece 12 is applied. Under this condition, the delay circuit 68 applies no start signal L' to the clock pulse generator circuit 38 and accordingly no output signal D is produced. Therefore, under the condition that discharge or short-circuiting does not occur between the electrodes, the applied voltage V is maintained at the high potential, the output signals B and C of the comparison circuits 32 and 34 are raised to the high level from the low level, the output signal E of the AND circuit 36 is maintained at the low level, and the outputs G, H and I of the AND circuits 40, 44 and 48 are maintained at the low level. Accordingly, the output of the NOR circuit 60 is maintained at the high level. The monostable circuit 62 being in reset state, the output of the monostable circuit 62 is at the high level. The output signal L of the monostable circuit 66 is also maintained at the high level. The FF circuit 70 is in a set state, while the FF circuit 80 is in a reset state. Thus, application of the voltage by the auxiliary switching circuit 26 is continued. At the time instant $t_2$ which occurs a very short time $\Delta t$ after the time instant $t_1$, the delay circuit 68 provides the delay signal L'. The delay signal L' is applied as the start signal for the clock pulse D. However, the output signal E of the AND circuit 36 is maintained at the low level.

At the time instant $t_3$ which occurs the set time $T_S$ after the time instant $t_1$, the output signal M of the monostable circuit 74 is raised to the high level. Therefore, the monostable circuit 78 provides the signal N which is at the low level for a moment, so that the FF circuit 80 is set. At this time instant, the output signal E of the AND circuit 36 is at the low level. Therefore, the output signals G, H and I of the AND circuits 40, 44 and 48 are maintained at the low level, and the application of the voltage by the auxiliary switching circuit 26 is continued.

Next, at the time instant $t_4$, discharge occurs between the electrodes, and the interelectrode voltage V is decreased. As a result, the output signal of the comparison circuit 32 is set to the low level, and the high level signal is applied to the AND circuit 36. Therefore, the latter 36 outputs the high level signal E. Accordingly, the output signal G of the AND circuit 40 is raised to the high level and is applied as the normal discharge signal to the monostable circuit 50, which provides the output G' which is at the high level for the period $T_1$. The output G' is applied to the NAND circuit 56, which provides the control signal P. As a result, the main switching circuit 24 is driven by the drive circuit 58, so that machining current according to the normal discharge is supplied between the electrodes, and at the same time the provision of the clock pulse D from the clock pulse generator circuit 38 is stopped.

As the output signal G of the AND circuit 40 is raised to the high level, the output signal J of the NOR circuit 60 is set to the low level. As a result, the switching element $Tr_1$ of the auxiliary switching circuit 26 is turned off, while the monostable circuit 62 is set, and the output thereof is at the low level for the pause period $T_{OFF}$.

Next, at the time instant $t_5$ which occurs in the period of time $T_1$, the output signal G' of the monostable circuit 50 is raised to the high level again and the output signal P of the NAND circuit 56 is set to the low level again. As a result, the switching elements in the main switching circuit 24 are turned off, so that application of the voltage across the electrodes is suspended.

At the time instant $t_6$ which occurs the pause period $T_{OFF}$ after the time instant $t_4$, the output signal K of the monostable circuit 62 is raised to the high level again, and the signal L of the monostable circuit 66 is set to the low level for a moment. Accordingly, similarly as in the above-described case, the FF circuit 70 is set so that the voltage is applied across the electrodes by the auxiliary switching circuit 26, while the FF circuit 80 is reset, and the monostable circuit 74 is set.

When, under this condition, discharge occurs between the electrodes, the interelectrode voltage V is at the low potential, the output signal B of the comparison circuit 32 is at the low level, and the output signal C of the comparison circuit 34 is raised to the high level. At the time instant $t_7$ which occurs the very short time $\Delta T$ after the time instant $t_6$, in response to the start signal L' from the delay circuit 68 the clock pulse generator circuit 38 provides the output D, whereby the output E of the AND circuit 36 is raised to the high level, and the FF circuit 80 being reset, the AND circuit 44 provides the high level signal H which represents the fact that the discharge is within the set time $T_S$. Accordingly, similarly as in the above described case, instead of the auxiliary switching circuit 26 the main switching circuit 24 applies machining current between the electrodes for a period of time corresponding to the "on" time $T_2$ of the monostable circuit 52.

At the time instant $t_8$ which occurs the pause time $T_{OFF}$ after the time instant $t_7$, the FF circuit 70 is set again, so that the auxiliary switching circuit 26 applies the voltage across the electrodes. If short-circuiting occurs between the electrodes at this time instant, the intervoltage V is zero, and accordingly the output signals B and C of the comparison circuits 32 and 34 are maintained at the low level. The FF circuit 80 being in reset state, the clock pulse D which is provided at the time instant $t_9$ which occurs the period of time $\Delta T$ after the time instant $t_8$ is applied through the AND circuits 36 and 42 to the AND circuit 48, which provides the high level signal I representing the short-circuiting state. Accordingly, similarly as in the above-described case, instead of the auxiliary switching circuit 26 the main switching circuit 24 applies machining current between the electrodes for a period of time corresponding to the "on" time $T_3$ of the monostable circuit 54.

At the time instant $t_{10}$ which occurs the pause time $T_{OFF}$ after the time instant $t_9$, the voltage is applied across the electrodes by the auxiliary switching circuit 26, and the above-described operations are successively carried out according to whether the discharge due to the application of the voltage is normal or abnormal and whether or not short-circuiting occurs between the electrodes.

It is preferable that the decision set time $T_S$ set by the monostable circuit 74 is 1 to 4 $\mu$sec as described below.

Figure 7:
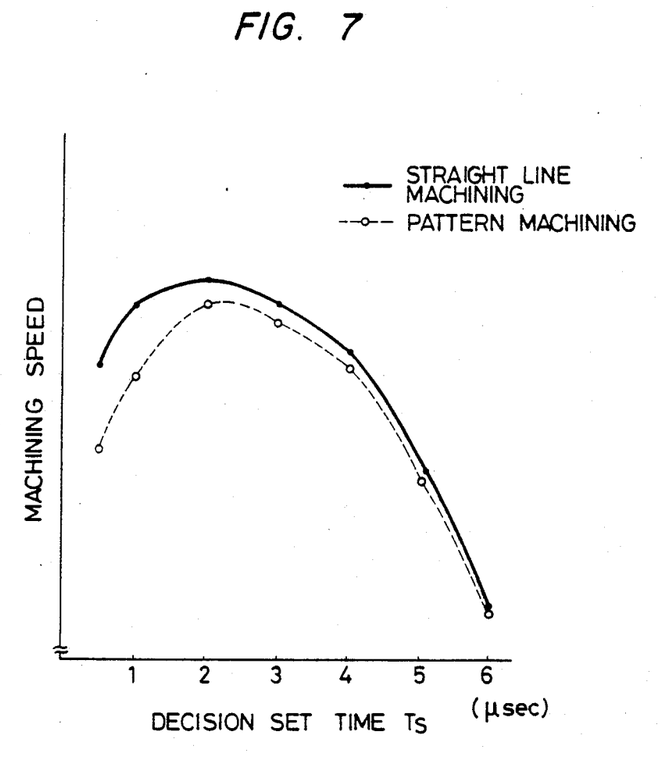
FIG. 7 is a graphical representation showing the results of electric discharge machining operations with the machine according to the invention.

In FIG. 7, the relations between set times $T_S$ and machining speeds in the machining operation with $T_2 = T_3$ and $T_1 = 5 T_2$ (where $T_1$, $T_2$ and $T_3$ are the "on" times of the monostable circuits 50, 52 and 54, respectively) are shown with respect to a straight line machining operation and a pattern machining operation including a corner machining operation. It is apparent from FIG. 7 that, as the time $T_S$ becomes relatively long, the frequency of breakage of the wire is reduced and the difference between the straight line machining operation and the pattern machining operation is reduced, but the machining speed is decreased because of the occurrence of short-circuiting. Satisfactory machining results are obtained with a set time $T_S$ of 1 to 4 $\mu$sec. It has been practically proved that, in this case, the machining speed is high, the wire is scarcely broken, and the machining speed can be high with a given surface roughness. Furthermore, it has been confirmed that, with a set time $T_S$ of 2 $\mu$sec, the maximum pattern machining speed is 1.5 to 2 times as high as that of the conventional machine.

In the above-described embodiment, the "on" time of the switching circuit is changed to control the machining current which is supplied during abnormal discharge or normal discharge. However, the current peak value may be varied, so that during abnormal discharge the current peak value is reduced.

In addition, the peak current of the auxiliary switching circuit may be increased, so that during abnormal discharge the auxiliary switching circuit supplies current for a predetermined period of time.

Furthermore, it goes without saying that the technical concept of the invention is applicable not only to the above-described wire cutting electric discharge machine but also to a general engraving electric discharge machine.

As is apparent from the above description, the electric discharge machine has the main switching circuit for supplying the current high in peak value between the electrode, and the auxiliary switching circuit for supplying the current low in peak value. Normally the auxiliary switching circuit applies the voltage across the electrode. If no discharge occurs between the electrodes before the decision set time of 1 to 4 $\mu$sec passes after the application of the voltage, then the auxiliary switching circuit applies the voltage across the electrodes until discharge occurs between the electrodes. After the discharge starts, the main switching circuit applies the normal machining current according to a desired surface roughness. If discharge or short-circuiting occurs between the electrodes before the decision set time passes, then a current smaller than the normal machining current is allowed to flow by the main switching circuit or the auxiliary switching circuit, respectively, whereby the machining speed is increased, and a machining speed for a given surface roughness is increased, and the machining stability is improved.

We claim:

1. An electric discharge machine comprising a main switch circuit for supplying a current high in current peak value between electrodes which are made up of an electrode and a conductive workpiece and an auxiliary switching circuit for supplying a current low in current peak value between said electrodes, to intermittently cause electric discharge between said electrodes thereby to machine said workpiece; said electric discharge machine further comprising control signal forming circuit means for turning switching elements of said main switching circuit and said auxiliary switching circuit on and off, said control signal forming circuit means comprising: initial voltage applying means for applying an initial voltage across said electrodes with the aid of said auxiliary switching circuit; a decision time setting circuit for setting a time long enough to decide whether discharge occurring between said electrodes is normal; a detector circuit for detecting the occurrence at least one of the group of discharge and short-circuiting between said electrodes; an initial voltage application continuing means for causing, when said detector circuit detects the occurrence of discharge after said time set by said decision time setting circuit has passed, the application of the initial voltage across said electrodes by said auxiliary switching circuit to continue until said detector circuit detects the occurrence of discharge; means for driving, when said detector means detects the occurrence of discharge after the application of the initial voltage by said initial voltage application continuing means is continued, said main switching circuit to supply a normal current between said electrodes according to a given surface roughness; and means for driving, when said detector circuit detects at least one of the group of the occurrence of discharge within the time set by said decision time setting circuit and the occurrence of short-circuiting, at least one of said main switching circuit and said auxiliary switching circuit to immediately apply a current smaller than said normal current between said electrodes.

2. An electric discharge machine as claimed in claim 1, characterized in that said time set by said decision time setting circuit is 1 to 4 μsec.

3. An electric discharge machine as claimed in claim 2, characterized in that said time set by said decision time setting circuit is 2 μsec.

4. An electric discharge machine as claimed in claim 1, characterized in that said electrode is a wire electrode.

5. An electric discharge machine as claimed in claim 1, characterized in that said detector circuit comprises: detecting means for detecting an interelectrode voltage; a first voltage setting unit for setting a first voltage which is higher than an arc potential during discharge and lower than a supply voltage; a second voltage setting unit for setting a second voltage which is lower than said arc voltage during discharge and higher than the zero potential; means for comparing said interelectrode voltage detected by said detecting means with said first voltage, to detect the occurrence of discharge; and means for comparing said interelectrode voltage with said second voltage, to detect the occurrence of short-circuiting.

6. An electric discharge machine as claimed in claim 1, characterized in that said main switching circuit comprises: a parallel circuit of a plurality of series circuits each including a resistor and a switching element, said parallel circuit being connected in series to a DC source, and voltage is applied across said electrodes by operating said switching elements of said main switching circuit.

7. An electric discharge machine as claimed in claim 6, characterized in that said switching elements are transistors.

8. An electric discharge machine as claimed in claim 6, characterized in that said auxiliary switching circuit is a series circuit of a series circuit of a resistor and a switching element, and a DC source, and voltage is applied across said electrodes by operating said switching element in said auxiliary switching circuit.

* * * * *